UNITED STATES PATENT OFFICE.

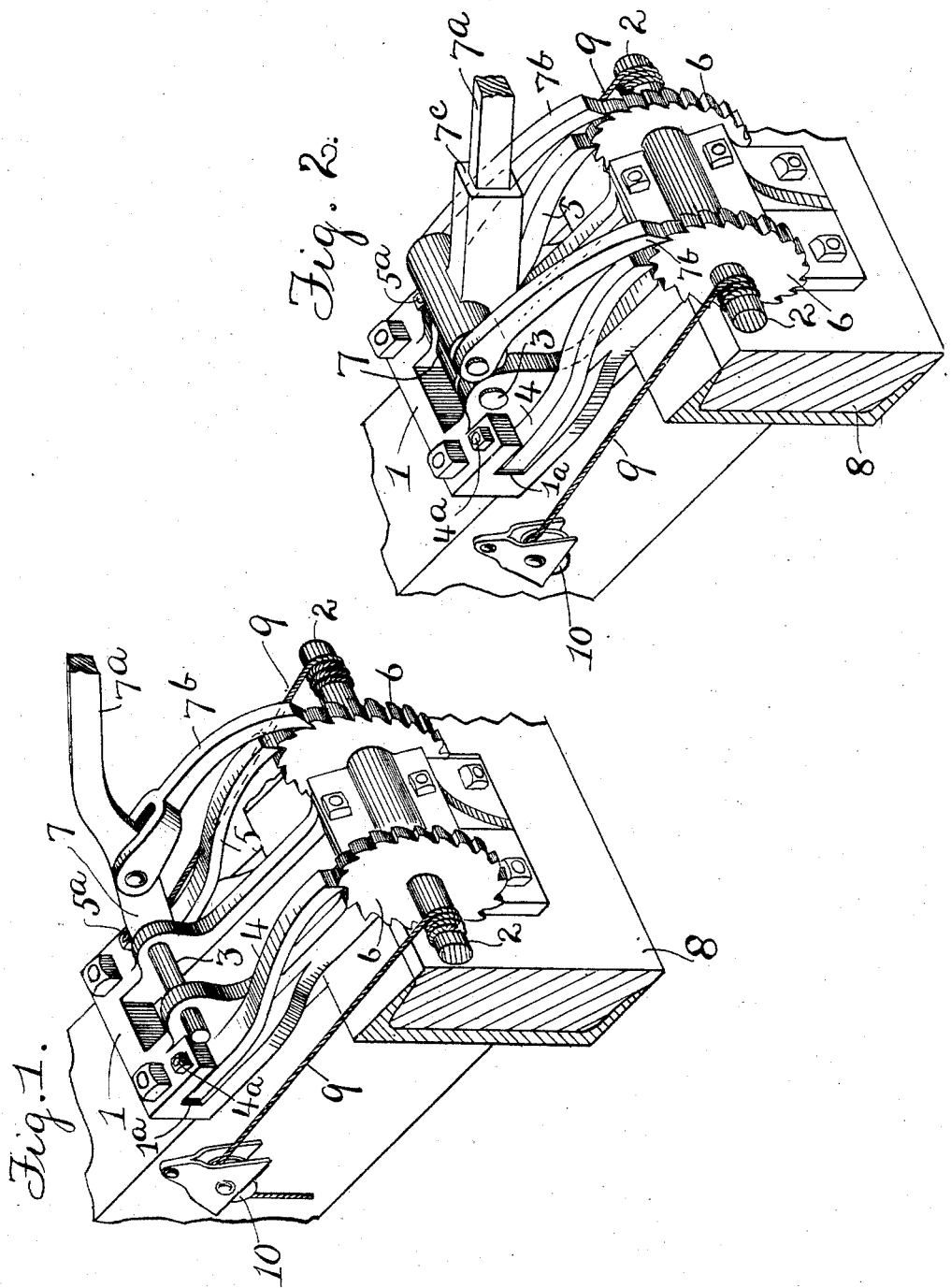

FRANK HAYES, OF SUPERIOR, WISCONSIN.

DOOR-CLOSING MEANS FOR SCOWS OR BINS.

No. 868,662.   Specification of Letters Patent.   Patented Oct. 22, 1907.

Application filed August 6, 1906. Serial No. 329,337.

*To all whom it may concern:*

Be it known that I, FRANK HAYES, a citizen of the United States, residing at Superior, in the county of Douglas and State of Wisconsin, have invented certain new and useful Improvements in Door-Closing Means for Scows or Bins; and I do hereby declare the following to be a full, clear, and exact description of the invention, such as will enable others skilled in the art to which it appertains to make and use the same.
My invention relates to door closing means for scows, or bins, and has for its object the provision of a convenient and simple gear and lever mechanism for rotating the windlass by which the door closing cables or chains are wound up.
It consists of the constructions, combinations, and arrangements of parts hereinafter described and claimed.

In the drawings, Figure 1 is a perspective view of one form of my said invention and Fig. 2, is a perspective view of a modified form thereof.
In the drawings, 1 is a casting forming, in part, a portion of the journal bearing of the shafts 2, 2, and in part the bearing of the shaft 3, and in part an anchorage and back-stop for the dogs 4 and 5. If desired, the part 3 in Fig. 1 may be constructed as an integral part of the casting 1, instead of as a shaft journaled therein. The casting 1 is recessed as at 1ª to receive the heels of the dogs 4 and 5. Bolts, or pins 4ª and 5ª are projected vertically through said recessed portions and through the heels of said dogs to anchor the dogs to the castings, but preferably not so as to receive the working pressure transmitted by said dogs from the hereinafter referred to ratchet wheels said working pressure being preferably received by the rear wall of said recess.

Upon the shafts 2, 2, are keyed ratchet wheels 6 6, which said dogs are, in operative position, adapted to engage and prevent from rotating in one direction. Upon the shaft or portion 3 is journaled a lever comprising a foot or hub 7, a handle 7ª, and a pawl or pawls 7ᵇ.

In the form shown in Fig. 1, the lever is preferably removable and carries a single pawl which pawl is preferably forked at its fixed end or heel, and the tines of said fork extend on either side of the hub and the pawl is pivoted to the hub through said tines. But it is obvious, without further description, that the hub 7 might be forked or slotted and the fixed end or heel of the lever be straight and pivoted in the slotted portion of the hub, or that said pawl might be otherwise constructed and otherwise affixed to the lever, all within the spirit and scope of my said invention. In the form shown in Fig. 2, the lever is also journaled on the shaft or part 3, but is not designed to be wholly and frequently removed therefrom.

In the form shown in Fig. 2, the hub and handle of the lever are preferably separable so that the handle may be frequently removed, for use with similar hubs.

In the form shown in Fig. 2, the lever includes two pawls 7ᵇ or, in effect, a divided or split pawl, one of which, or one part of which operates upon one ratchet wheel 6 and the other of which operates upon the other ratchet wheel 6. One of these pawls in Fig. 2, may, if desired, be thrown back out of operating position, while the other is working. In the form shown in Fig. 2, the handle portion is mounted in a suitable socket formed in the hub portion 7ᶜ of the lever. It will be observed that the effect of this construction is to form a toggle jointed lever by which greater turning power can be brought to bear on the shaft than when following the old method of applying hand levers hereinafter referred to.

Since the width of deck for standing room on a scow is limited, it is obvious that the beneficial use of a longer lever is obtainable by my construction than in a case where the whole effective length of the lever must be limited to the distance between the operator and the shaft. Said casting 1 is mounted on any suitable support, such for example as the side coaming 8 of a scow (the main body of the scow not being shown). Chains or cables 9, are secured to the windlass shafts 2, and are preferably led through guide pulleys 10, secured to the end walls of the bins or scow-hoppers, and the opposite ends of said cables are secured to the hopper-doors or trap doors (not shown) in the floor of said bins, or scow hoppers.

Heretofore and before the invention disclosed by the United States Letters Patent No. 806,807 issued to me and William Clifford jointly, under date of Dec. 12, 1905, it was customary to position the dogs without any pivotal connection with the support and to secure them by a slack chain or cord. This was a very inconvenient method and caused much loss of time and energy and, not infrequently, the loss of the dogs through the breaking of the slack chains when the dogs were knocked out of engagement with the ratchet wheels to permit the unwinding of the cables connected with the hopper doors. Before the invention described by said patent, it was also customary to wind up said cables by inserting a lever into one or another of a series of peripheral recesses formed in a collar keyed to a windlass shaft, equivalent to the shaft 2. Such former method of winding up the cables, was, as will now be obvious, also productive of a waste of time and energy. Furthermore, when the shaft was turned, as formerly customary, by a pawl or lever inserted into a recess in the shaft collar, there was nothing provided to retain the lever in the recess, and too often when the lever was brought down to a horizontal position it would slip out of the recess, and the operator would lose his balance and fall overboard, this was especially apt to occur when the sea was running high.

In the operation of my invention, the lever including the pawl or pawls is rocked to wind up the cable and close the doors, the dogs engaging the ratchet wheels to prevent counter rotation of the windlass shafts. When the hoppers or bins have been filled, and it is desired to discharge their contents, the dogs are struck outward, laterally, with a sledge, to disengage them from the ratchet wheels, the doors being thereupon forced open by their own weight and the weight of the load. It will be observed, however, that in the form of my invention shown in Fig. 2, the socket portion of the lever may, after removal of the handle portion, drop down between the dogs and form an interference to the striking of the dogs on the side necessary to disengage therefrom the ratchet wheels, thereby protecting said dogs from accidental disengagement, though said socket may be lifted and thrown back where it is desired to strike the dogs.

What I claim is,

1. In door closing mechanism for scows or bins, the combination with suitable support, of a windlass mounted mounted thereon, a windlass journaled on said support, a ratchet wheel keyed to the windlass for rotating the same, flexible means secured to said windlass, a lever pivotally mounted on said support and adapted to rock on an axis eccentric to the axis of rotation of said windlass and parallel thereto, a pawl pivotally mounted on said lever and adapted to engage said ratchet wheel to rotate the same, a dog pivotally mounted on said support and adapted to engage said ratchet wheel to prevent counter rotation thereof, said pawl being adapted to swing sidewise with relation to said ratchet wheel to disengage from the same, and said lever being adapted to be pivotally lowered into protective position with relation to said pawl at that side of the pawl on which the pawl-disengaging force is applied, whereby said pawl is protected from accidental disengagement.

2. In door closing mechanism for scows or bins, the combination with suitable support, of a windlass mounted thereon and comprising a shaft, a ratchet wheel secured to said shaft and adapted to rotate the same, and flexible means secured to said shaft and adapted to be in part wound up on the same; a lever adapted to rock on an axis parallel with and separate from the axis of said shaft and adapted to be separated from its own support, a pawl adapted to be operated by said lever and to engage said ratchet wheel to rotate the same, and a dog adapted to engage said ratchet wheel to prevent accidental counter rotation of the same.

In testimony whereof I hereunto affix my signature, in presence of two witnesses.

FRANK HAYES.

Witnesses:
JAMES T. WATSON,
AUDEN JOHNSON.